United States Patent [19]

Hinds

[11] Patent Number: 4,618,924
[45] Date of Patent: Oct. 21, 1986

[54] AUTOMATIC MACHINING USING CONSTRUCTIVE SOLID GEOMETRY WITH BOOLEAN COMBINATIONS OF PRIMITIVES INCLUDING TOOL OFFSETS TO FORM A MACHINING PATTERN

[75] Inventor: John K. Hinds, Scotia, N.Y.

[73] Assignee: General Electric Company, Schenectady, N.Y.

[21] Appl. No.: 655,185

[22] Filed: Sep. 28, 1984

[51] Int. Cl.$^4$ ............................................... G05B 9/00
[52] U.S. Cl. .................................. 364/191; 364/168; 364/170; 364/474; 318/568
[58] Field of Search ................................. 364/167–171, 364/188, 189, 191, 192, 193, 513, 474, 475; 318/568; 340/705, 721, 723, 724, 734, 745

[56] References Cited

U.S. PATENT DOCUMENTS

| | | | |
|---|---|---|---|
| 4,152,765 | 5/1979 | Weber | 364/191 |
| 4,513,366 | 4/1985 | Munekata | 364/188 |
| 4,530,046 | 7/1985 | Munekata | 340/724 |
| 4,533,286 | 8/1985 | Kishi | 364/474 |

FOREIGN PATENT DOCUMENTS 0130219  1/1985  European Pat. Off. ............ 364/191

OTHER PUBLICATIONS

Solid Modeling: A Historical Summary and Contemporary Assessment; IEEE Computer Graphics & Applications, Mar. 1982, Requicha et al, pp. 9–24.
Hinds, J. K. & Kuan, L. P., "Sculptered Surface Technology as a Unified Approach to Geometric Definition", Advanced Manufacturing Technology, ed. by P. Blake, North–Holland Publishing Co., 1980, pp. 19–40.
Farouki, R. T. & Hinds, J. K., "Truce-the Tridimensional Rational Unified Cubic Engine–User's Manual", General Electric Co., Corporate Research and Development, Schenectady, N.Y. (Chapters 1, 8, 12).
Lee, R. B. & Fredricks, D. A., "Intersection of Parametric Surfaces and a Plane", IEEE Computer Graphics and Applications, Aug. 1984, pp. 48–51.
Farouki, R. T. & Hinds, J. K., "A Hierarchy of Geometryc Forms", submitted to IEEE Computer Graphics and Applications, Aug. 1984.

*Primary Examiner*—Jerry Smith
*Assistant Examiner*—Allen MacDonald
*Attorney, Agent, or Firm*—Donald R. Campbell; James C. Davis; Paul R. Webb, II

[57] ABSTRACT

Constructive solid geometry is a technique of representing parts by adding and subtracting a set of primitive shapes. Automatic tool paths to machine a part with a rotating cutter are generated by taking the constructive solid geometric description of the part and replacing every primitive shape by an offset primitive, larger or smaller than the part by the cutter radius. A planar section slice of the offset part has the property that the center of the milling cutter will traverse this section curve and form the original part without gouging. To machine efficiently, a series of parallel slicing planes are taken from top to bottom through the offset part. For each section curve, numerical control machine code is generated to direct the cutter to follow that path, and the part is automatically machined. The method applies to both rough and finish cutting.

14 Claims, 16 Drawing Figures

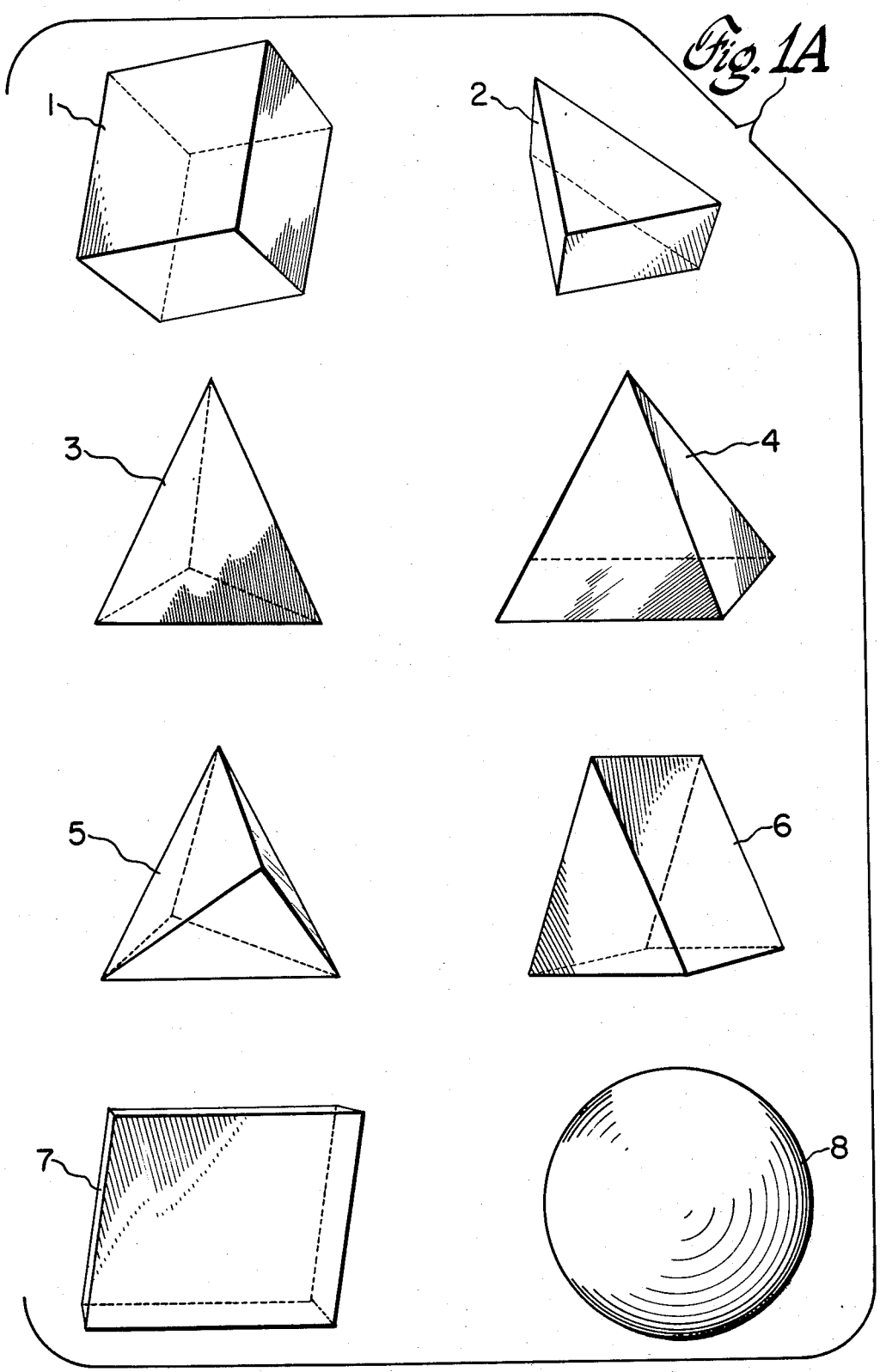

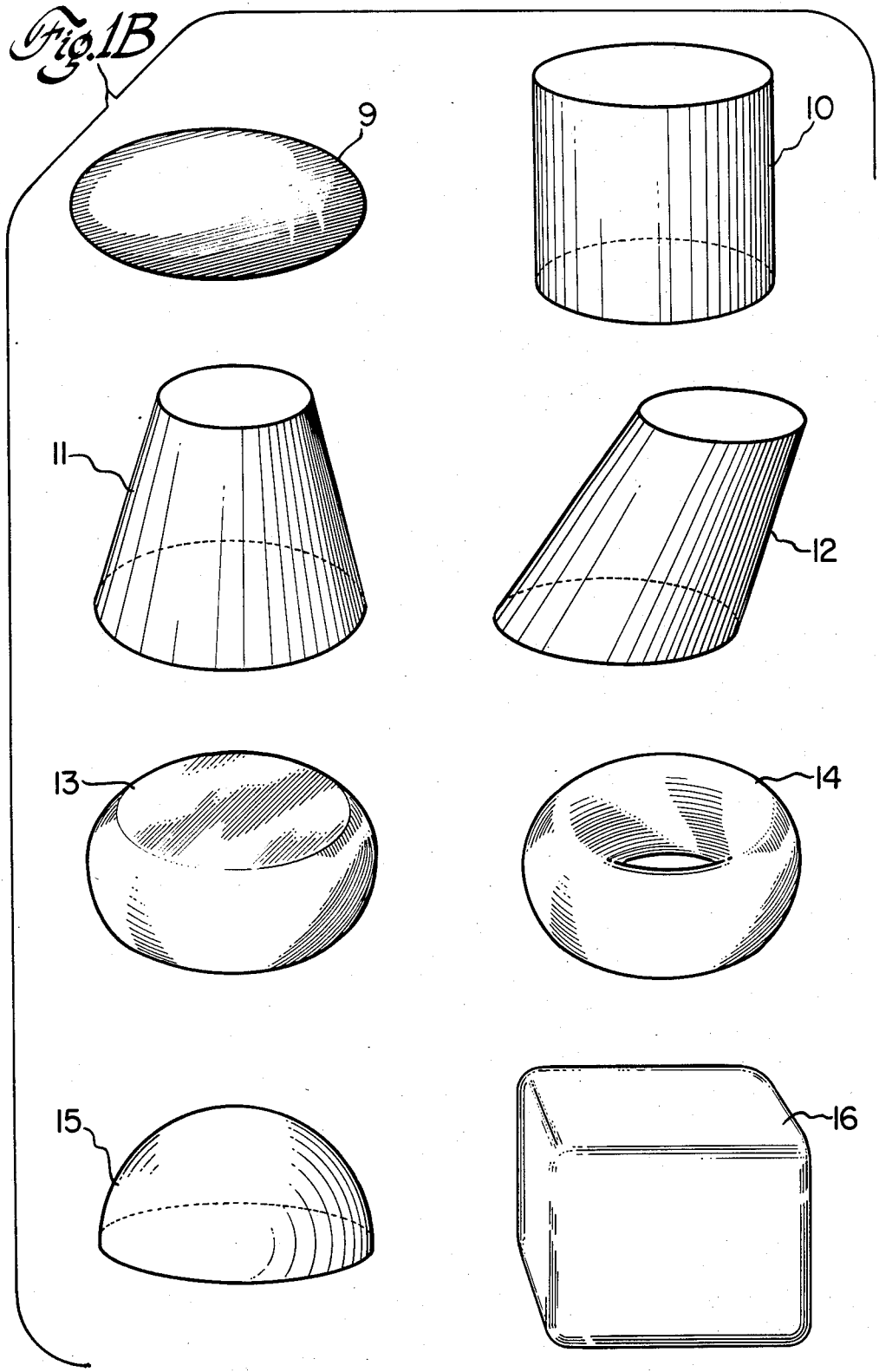

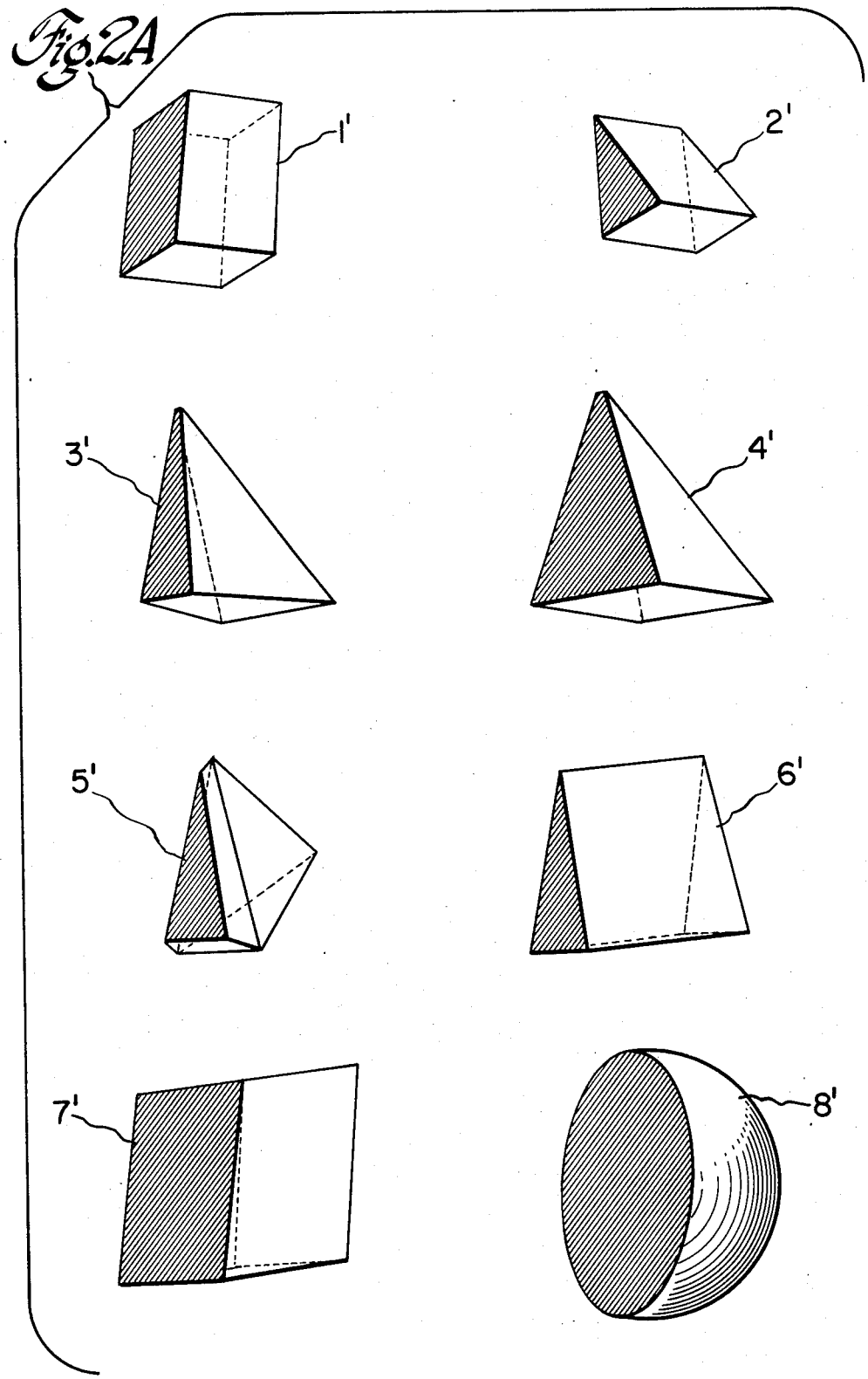

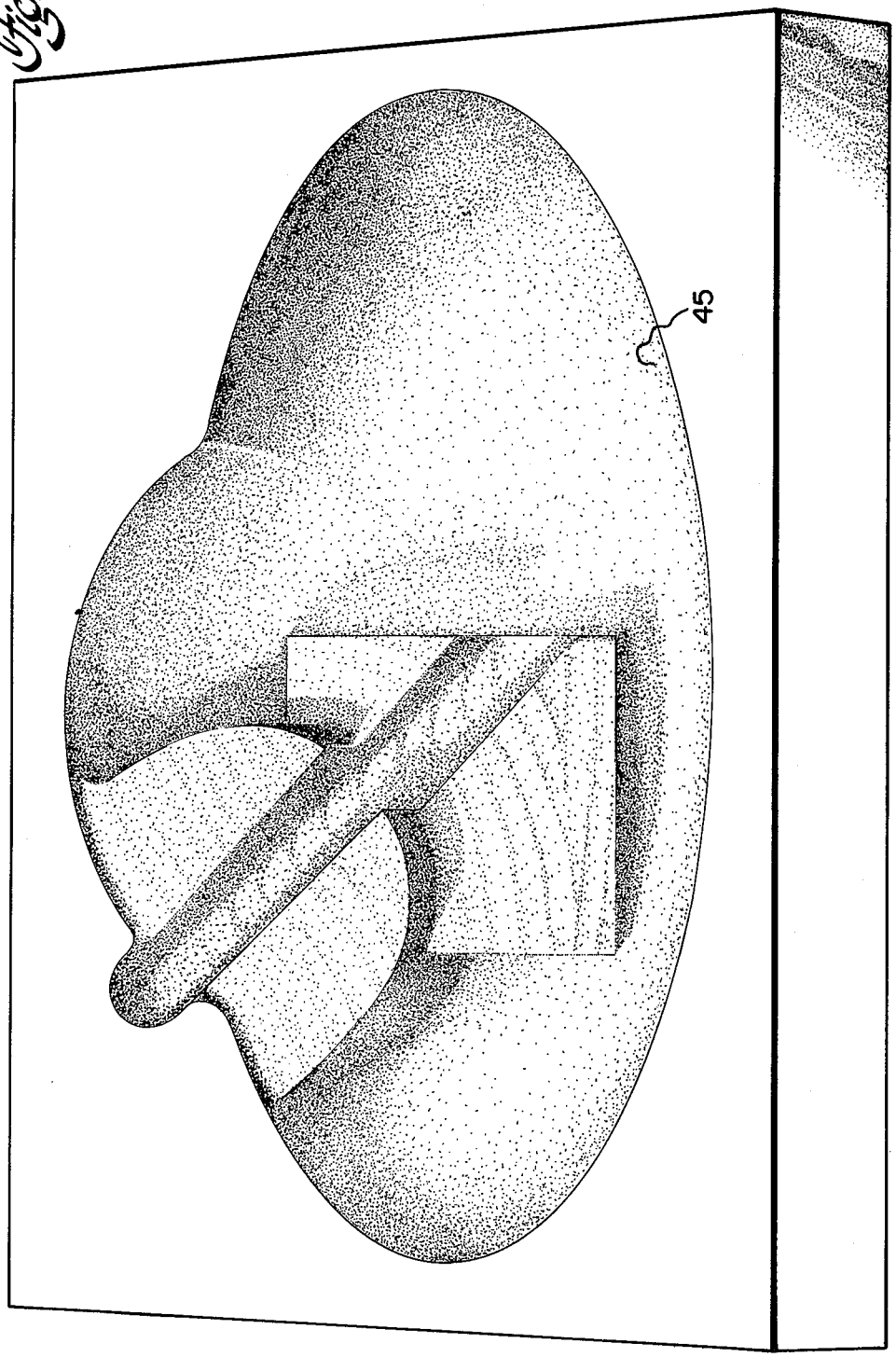

AUTOMATIC MACHINING USING CONSTRUCTIVE SOLID GEOMETRY WITH BOOLEAN COMBINATIONS OF PRIMITIVES INCLUDING TOOL OFFSETS TO FORM A MACHINING PATTERN

BACKGROUND OF THE INVENTION

This invention relates to a method of automatically machining 3-dimensional solid parts from an abstract definition of the part.

Current technology for machining complex metal parts is usually to make drawings of the outlines and dimensions of the desired part. These are given to a model maker who makes various section plates and then fills the desired part between sections with plaster. A steel model of the part is then obtained by copy milling from the model maker's part to the steel part.

A second technological approach to machining complex parts is to use current programming systems. These permit users to individually direct a tool across facets of the part but do not provide a technique for total description and automatic gouge free machining of a solid part. The model maker's skill is still employed because of the complexity of programming tool motion through a region with multiple interfacing geometric shapes.

Female parts are derived by forming a male part in carbon and then using electrical discharge machining to erode the reverse shape out of metal.

Constructive solid geometry (CSG) is a method of representing objects by adding and subtracting a basic set of solid shapes called primitives. Primitives might be cubes, cylinders, cones, spheres, ellipsoids, etc. Two or more primitives can be combined to form a new solid object by an ordered series of Boolean additions and subtractions among the primitive shapes. The systematic application of the Boolean set operations is usually controlled by a binary tree data structure commonly referred to as CSG tree. Information on CSG and solid modeling and a history of the field and its status is given papers by A. A. G. Requicha and H. B. Voelcker in IEEE Computer Graphics and Applications, March 1982 and October 1983.

SUMMARY OF THE INVENTION

An object of the invention is to achieve automatic practical machining of a part from an abstract description of the object in terms of set operations and constructive solid primitives.

Another object is to provide a method for the automatic, interference-free machining of complex 3-dimensional solid parts based on a process of offset primitives.

The method of machining solid parts on a machine tool having a rotating milling cutter, such as ball end tool, has as an initial step providing a constructive solid geometric description of a desired part expressed as a Boolean combination of primitive shapes. In this environment many complex parts can be described quickly and associated shapes, such as forming blocks, are described by simple additional set operations. Automatic machining is achieved by the introduction of offset primitives and offset parts. Offset primitives are determined by offsetting every primitive shape by an amount equal to, in one case, the radius of a spherical milling cutter. Primitives which are united or intersected are offset by a positive radius, increasing their size, and primitives which are subtracted are offset by a negative radius, decreasing their size (see FIG. 5). A description of an offset part is created which is a Boolean combination of offset primitives and the result of applying the same set operations as in the initial method step and part description. The perimeter of this offset part is the envelope of cutter positions to produce the desired part.

Planar section slices of the offset part are taken and section curves, the intersections of slicing planes with the offset part, are obtained. These curves describe the tool paths followed by the center of the rotating cutter to make finish cuts. The number and spacing of the slicing planes depends on the desired resolution and tolerance in the finished part. An efficient machining path is achieved by selecting a series of parallel section planes from top to bottom through the offset part. The final steps are to generate machine tool position commands, for instance numerical control machine code, to direct the milling cutter to follow these curves, and automatically machining the desired part.

Gross material removal is accomplished by offsetting the section curves, confining the problem to the slicing plane, and generating NC machine code to direct the cutter to follow the offset curves to make rough cuts. One application of the automatic machining method is tooling for plastic molds, especially those with interference ribs, strengtheners, and stud holes.

BRIEF DESCRIPTION OF THE DRAWINGS

FIGS. 1A and 1B show examples of primitive shapes used in constructive solid geometry.

FIGS. 2A and 2B illustrate slicing primitive shapes; the primitives of FIGS. 1A and 1B have been sliced by a common plane and may be shown from a different vantage point.

FIG. 14 is a perspective view of a cavity for the ribbed part in FIG. 13.

DETAILED DESCRIPTION OF THE INVENTION

Constructive solid primitives modeling begins with primitive three-dimensional shapes. Examples of primitive shapes are shown in FIG. 1. These primitives can be positioned, sized and oriented in three-dimensional space freely. Those illustrated, numbered 1–16, are: cube, prism, pyramid, pyramid, polyhedron, wedge, box, sphere, ellipsoid, cylinder, truncated cone, truncated elliptical cone, solid torus, torus, hemisphere, and enhanced box.

Figure 2B:
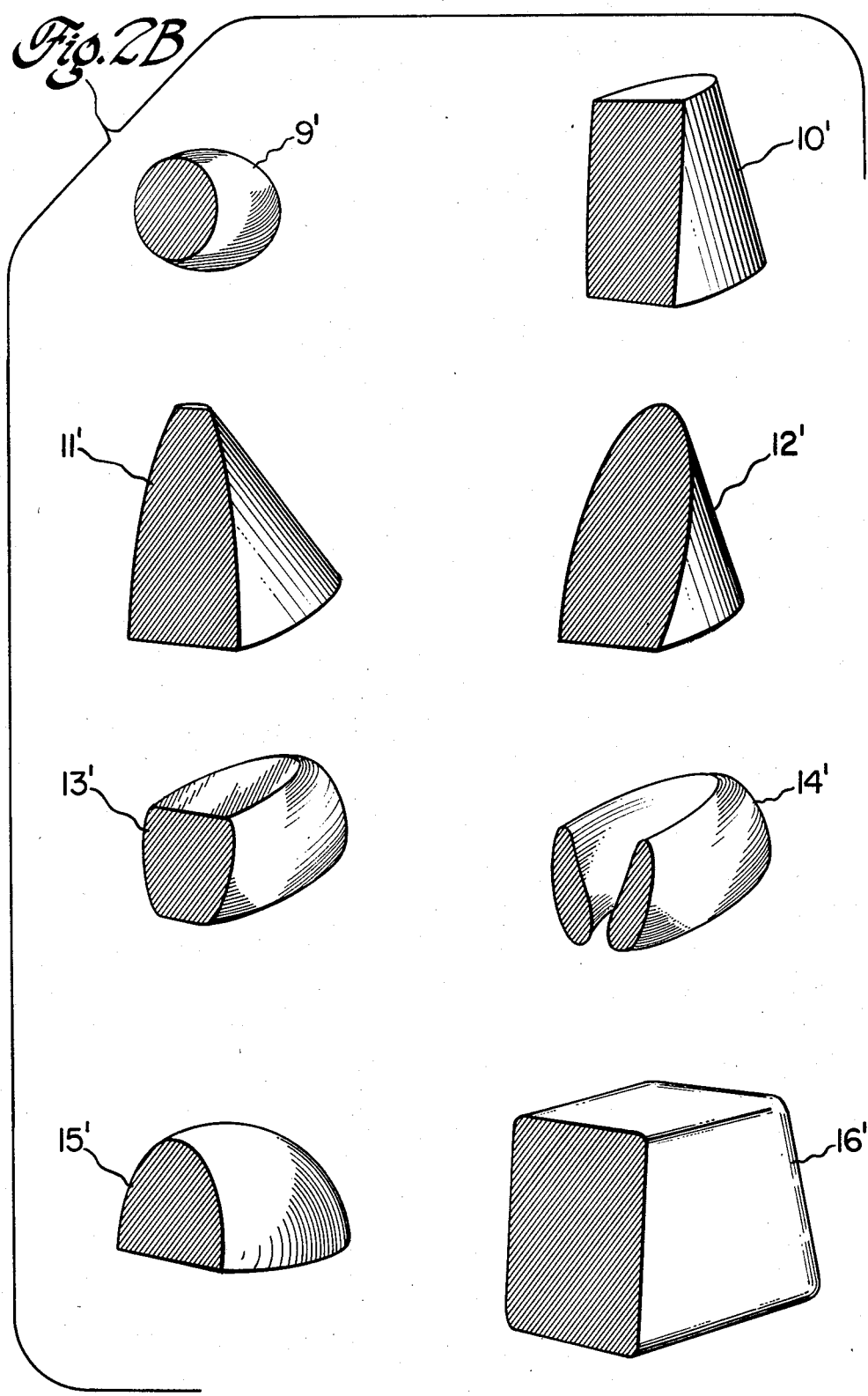

These primitives can be operated upon by planar section slicing. This means that the planar curve where an arbitrary plane cuts each primitive can be determined. The concept of slicing primitive shapes is shown in FIG. 2 where all the primitives of FIG. 1 have been sliced by a common plane and are shown from a different vantage point. The sliced primitives are designated 1′–16′.

Constructive solid geometry is a method of representing parts by adding and subtracting a basic set of primitive shapes. A part is described by forming consecutive sums, differences and intersections among specific primitives. Two primitives (for instance, A and B) can be combined to form a new solid object by applying one of the volumetric Boolean set operations defined as follows:

Union or Sum: that volume of space found in either A or B

Intersection: that volume of space found in both A or B

Subtraction or Difference: that volume of space found in A but not found in B.

Figure 3:
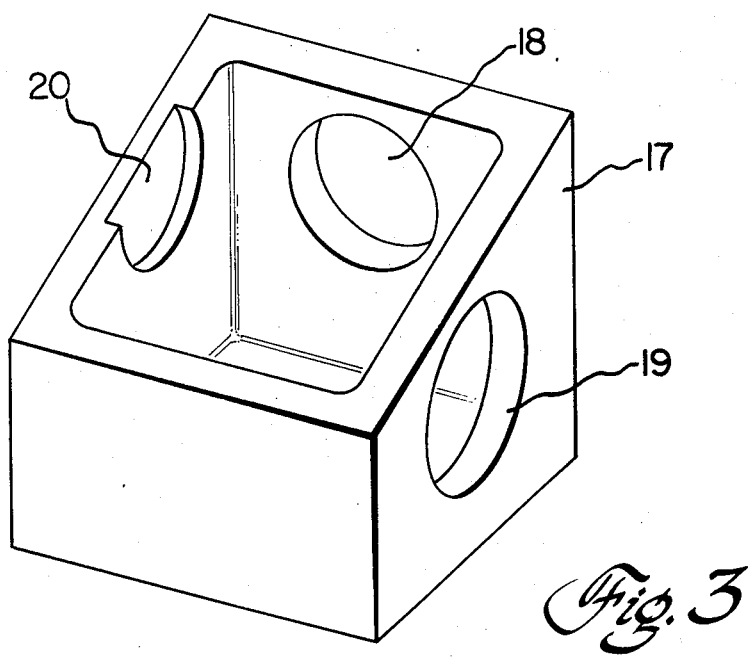
FIG. 3 has a box formed by subtracting three cylinders and one blended box from a simple box with sloping top.

The systematic application of the Boolean set operations is usually controlled by a binary tree data structure commonly referred to as a CSG or Boolean tree. As an example, the box in FIG. 3 is formed by subtracting three cylinders and one blended corner box from a simple box with sloping top. The resulting hollow box 17 has circular holes 18 and 19 in two walls and, in the third wall, a semicircular recess 20.

Figure 4:
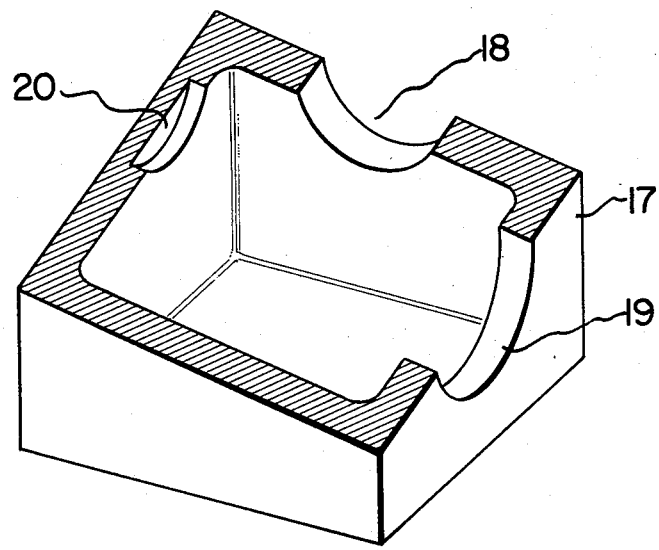
FIG. 4 shows a planar section slice of the part in FIG. 3.

A plane section slice of a part is formed by taking slices of each individual primitive and by forming the resultant boundary curve. This concept is illustrated by showing a planar section slice in FIG. 4 of the previous part, the hollow box 17.

Figure 5:
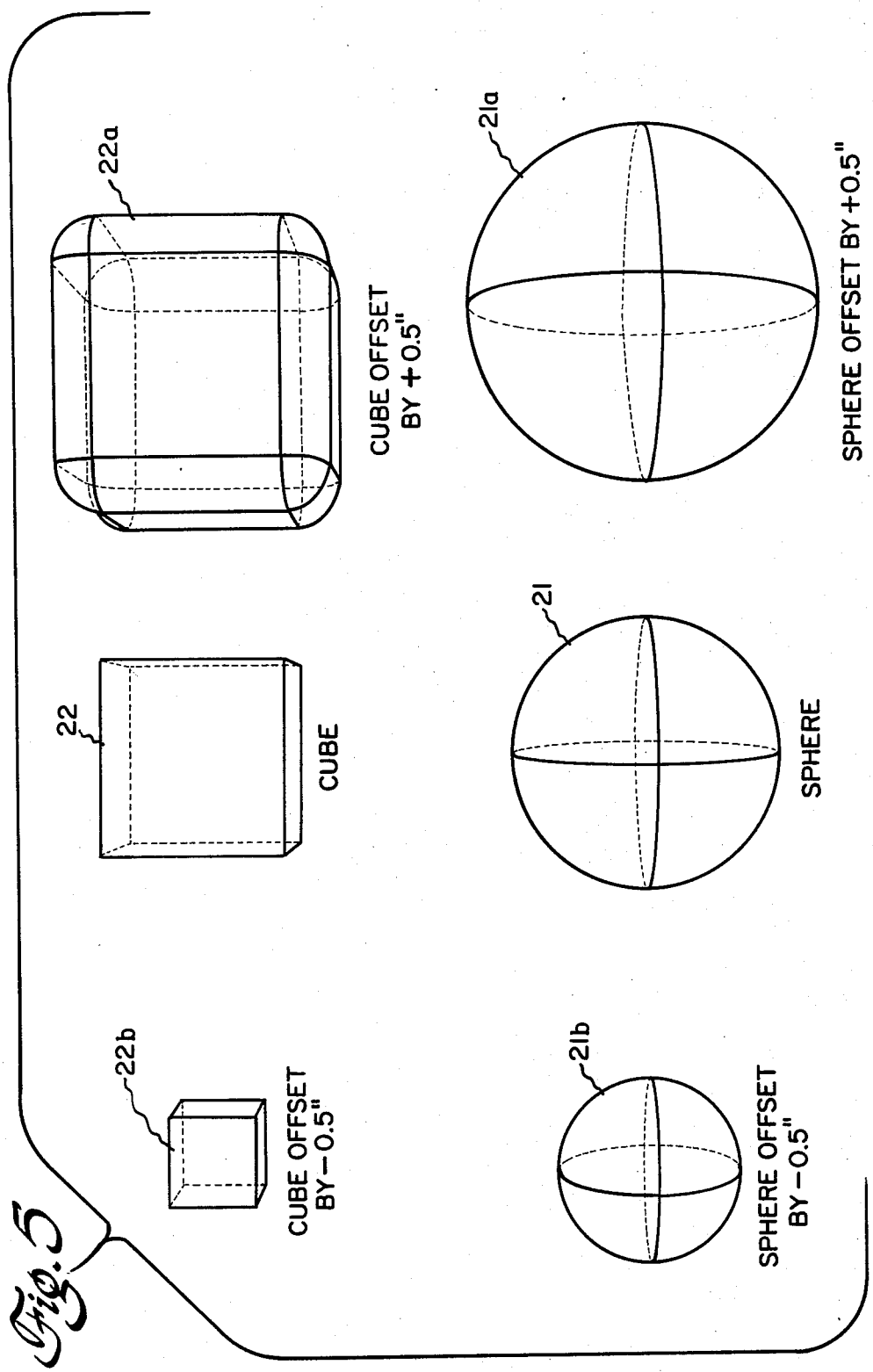
FIG. 5 depicts positive and negative offsets of a sphere and a cube.

An offset of a primitive is formed by rolling a ball of specified diameter around a given primitive. The outside periphery of the positions of this ball forms an offset primitive to the given primitive. Referring to FIG. 5, the offset by +0.5 inches of a primitive sphere 21 of radius 1 inch is a sphere 21a of radius 1.5 inches. The offset by −0.5 inches is a sphere 21b of radius 0.5 inches. Additive primitives are increased in size, or offset outward, and subtractive primitives are decreased in size, or offset inward. The offset by +0.5 inches of a cube 22 is a rounded corner cube primitive 22a. Note that offset primitives require new sets of primitive shapes, since the offset of a simple primitive may be a primitive of a different nature. An offset can be positive or negative. A negative offset contracts the part. FIG. 5 shows that the positive offset of the cube is a rounded corner cube and that the negative offset of a cube is a simple cube 22b with no rounding.

Figure 6:
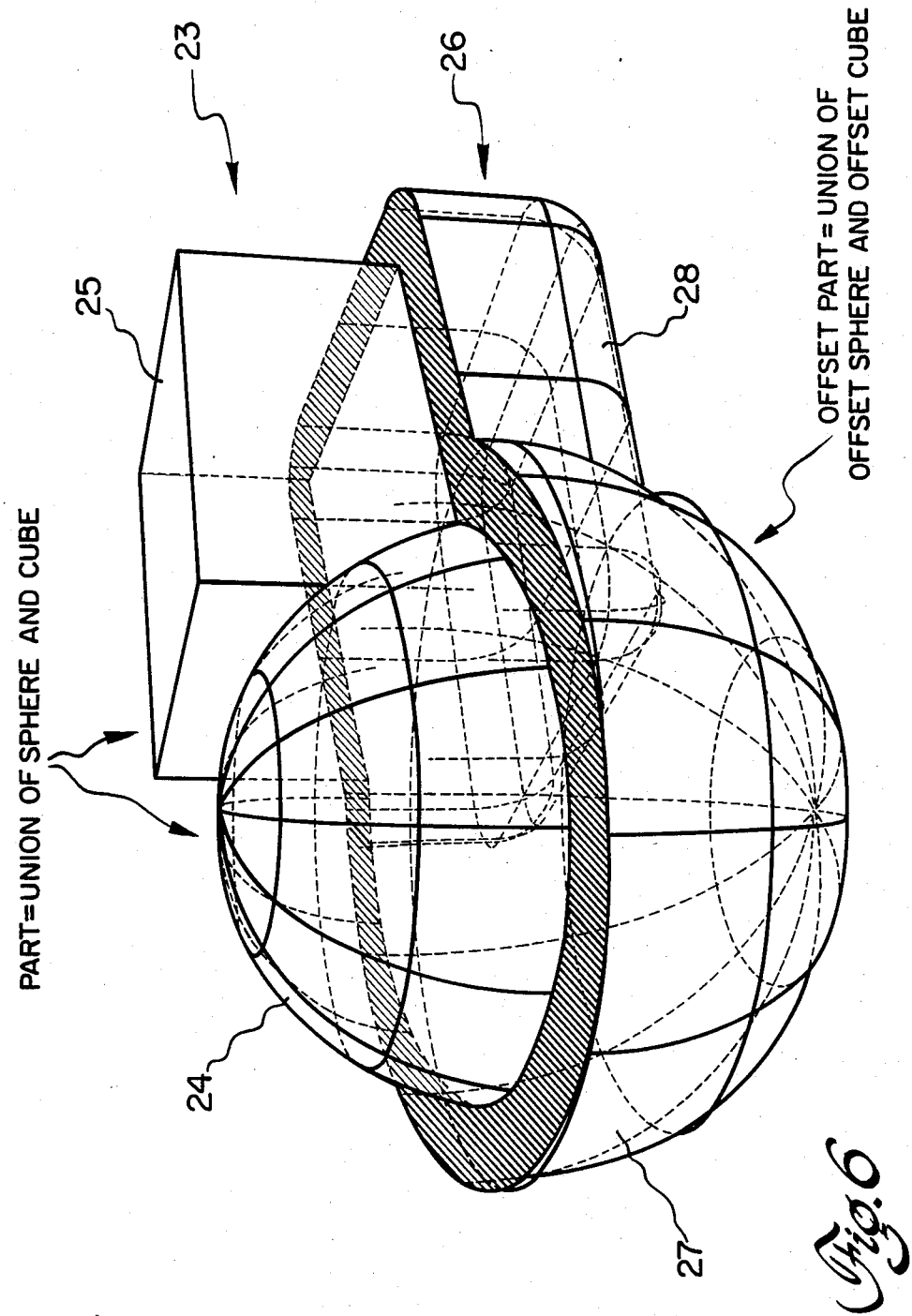
FIG. 6 shows a partial cutaway of a part which is the union of a sphere and a box; the lower half shows the offset part, the union of the offset sphere and offset box.

An offset by a given radius to a part is defined by offsetting each and every primitive in the part description by plus or minus the given radius. Primitives which are united or intersected are offset by a positive radius, and primitives which are subtracted are offset by a negative radius. FIG. 6 shows a partial cutaway of a part 23 described as the union of a sphere 24 and a box or cube 25. The lower half of the figure shows the offset part 26 formed by uniting the two offset primitives, namely the offset sphere 27 and the appropriate rounded corner box 28. The offset part results from applying the same series of Boolean set operations which produced the original part. Now, however, these set operations are applied to the offset primitives.

The automatic machining of solid parts using constructive solid geometry and offset primitives is explained as follows. Tool paths must be automatically generated which form a desired part within the limits of cutter size, do not gouge the part, and which permit reasonable control of tool chip load. Automatic tool paths using spherical end-mills, cylindrical-shaped and other rotating cutters can be generated by taking the constructive solid geometric decription of the desired part and by replacing each and every primitive shape by its appropriate offset primitive. In the case of a spherical end-mill the offset is by a fixed cutter radius. Now any planar section slice of the offset part has the property that the center of a ball end-mill of specified radius may traverse this section curve and will in fact form the original part as closely as possible without gouging. A practical automatic machining method is then to form consecutive slices of the offset part from top to bottom. The process will leave material according to the natural scallop height between passes, and where the cutter cannot penetrate the part due to its radius, a natural blend of the part will be formed. Regions of the part where undercuts occur may be avoided by forming the set union of each lower cutter pass with all higher cutter passes. While undercut regions cannot be formed, at least the part is not gouged and the undercut regions may be machined by reorienting the part and repeating the process in the new orientation. The entire process can be implemented in a machine tool controller, thus in effect permitting automatic copy milling from an abstract model description.

Figure 7:
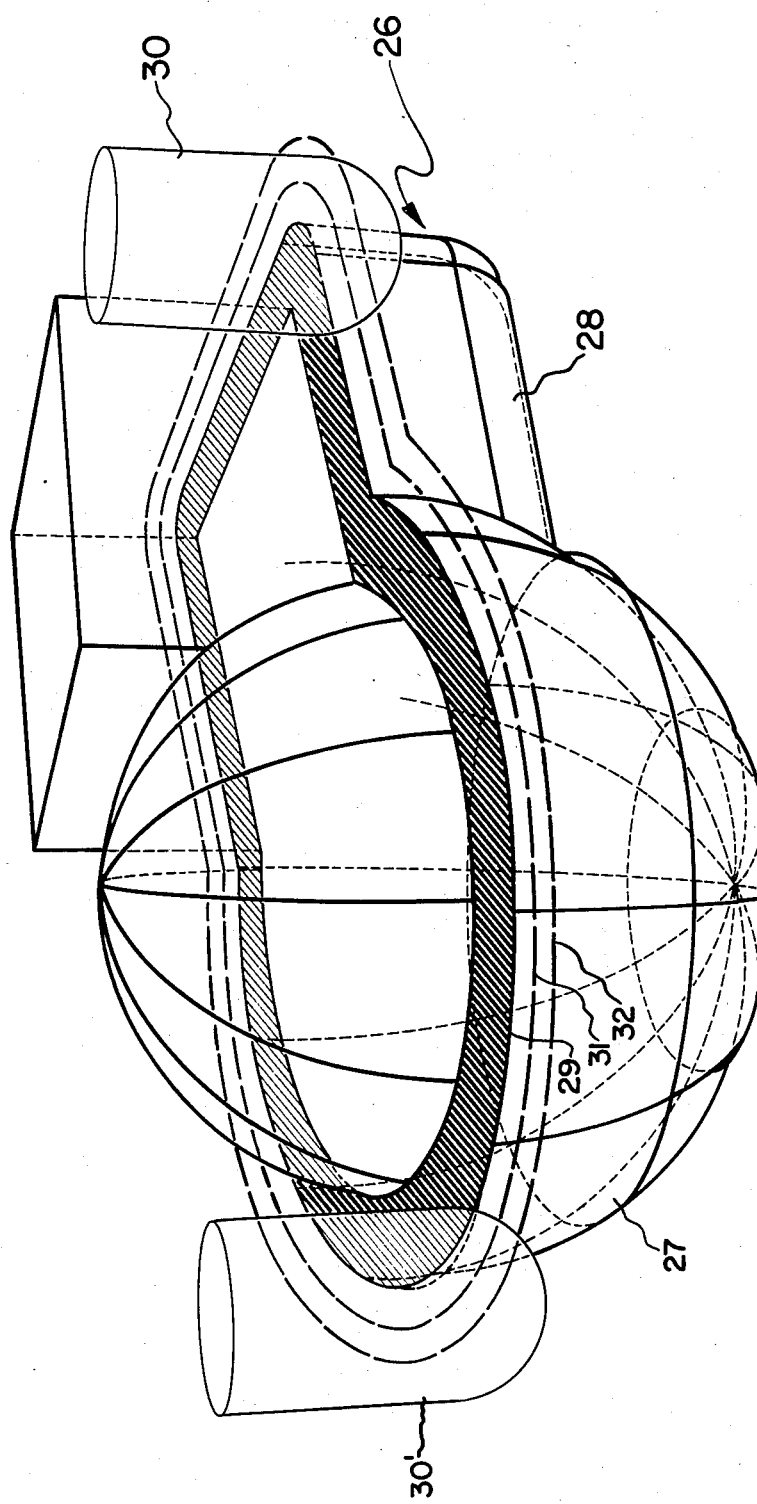
FIG. 7 shows a plane section slice of the offset part and positions of a ball end cutter as it "machines" the part.

In FIG. 7, a plane section slice of the offset part 26 is formed, and the section or boundary curve 29 is obtained, the intersection of the slicing plane with the offset part. A ball end cutter 30 of specified radius is illustrated with its center positioned at points of the planar section slice of the offset part. If the center of cutter 30 follows the section curve 29 and traces a closed loop, the desired part is machined. These cutter positions touch the original part without gouging. This picture and idea transmit the essence of the idea for automatic machining of a model from a constructive solid modeling description.

An efficient machining path can be achieved by selecting a series of parallel section planes from top to bottom through the offset part. By following these curves, a spherical end-mill of specified radius will form the part. A special strategy can be implemented to cause the cutter to retract at the end of one curve, and position over and plunge to the next to avoid gouging in transition between curves. The section curves can be traversed in either direction, and if the milling machine numerical control can accept the section curve coefficients then a very smooth trajectory of the cutting tool across the surface can be achieved. It is seen that the section curves are on the perimeter of the offset part which is the envelope of curve positions to produce the desired part. Regions of undercut may be avoided by saving previous cutter positions and by not permitting the cutter to enter regions that have been cut at a higher planar section station.

The requirement of gross material removal is accomplished by developing slices of several offset primitives through a common plane section. By moving on a trajectory from the larger offset values first to the smaller values an effective process may be established to remove all of the material between the blank part and finish part. Two outwardly offset curves 31 and 32 are illustrated in FIG. 7, and are the paths followed by the center of the cutting tool to make rough cuts. Cutter 30' follows curve 31 during the final rough cut. The problem of rough passes is confined to the slicing plane and is two dimensional.

The final steps in the machining process are that machine tool position commands are generated to direct the milling cutter to follow the offset curves 31 and 32 to make rough cuts and the section curves 29 to make finish cuts. For each such section curve or offset curve, numerical control (NC) machine code is generated which will direct the center of the rotating cutter around these paths. Circular and linear arcs are created which fit the section curve 29 within a user-specified tolerance. The circular arcs are converted directly into NC machine code. The use of circular interpolation in machining, as opposed to separate linear moves, results in a much more efficient machine code and a higher quality finish on machined parts. The foregoing steps, up to entering machine code into the machine tool controller, are performed on a properly programmed computer having a graphics display device. The final step is that the desired part itself is machined with a ball end cutter.

Figure 8:
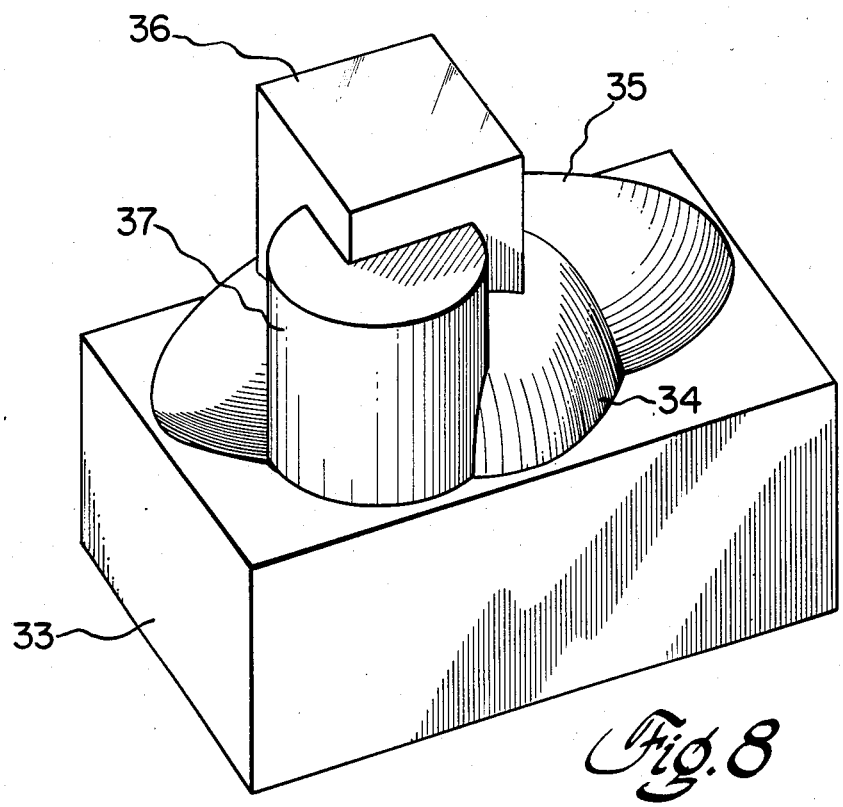
FIG. 8 is a raster graphics display of five primitive objects which when combined produce the part in the next figure.
Figure 9:
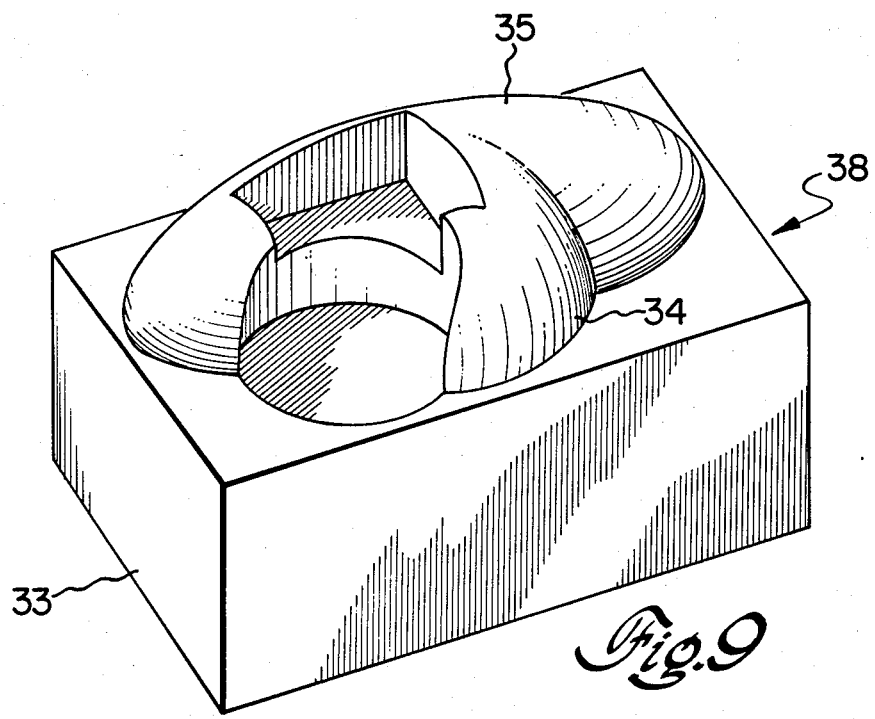
FIG. 9 illustrates the part shape after an ordered series of Boolean additions and subtractions among the primitive shapes.

A sample part is employed to review the use and implementation of the process. As a first step, the three-dimensional primitive shapes which make up the desired part are selected and defined. FIG. 8 shows a raster graphics display of five properly oriented primitive shapes, namely a large block 33, sphere 34, ellipsoid 35, small block 36, and cylinder 37. The actual part shape which is desired results from an ordered series of Boolean set operations among the primitive shapes. FIG. 9 is a raster display of the desired part 38 after these set operations are applied. The desired part shape is arrived at by adding together the large block, sphere and ellipsoid, and subsequently subtracting the small block and the cylinder.

The third step is to offset the five primitives by an amount equal to the radius of the rotating cutter which will be used to machine the part. Additive primitives are offset outward and increased in size; subtractive primitives are offset inward and decreased in size. The offset operations insure that the correct part primitive outlines are machined by the cutting tool. Also, this offsetting method is the foundation for the interference-free nature of this automatic machining process. In step four, a description of an offset part is created which is a Boolean combination of the offset primitives and the result of applying the same set operations as in defining the original part. The offset primitives and offset part are not illustrated.

Figure 10:
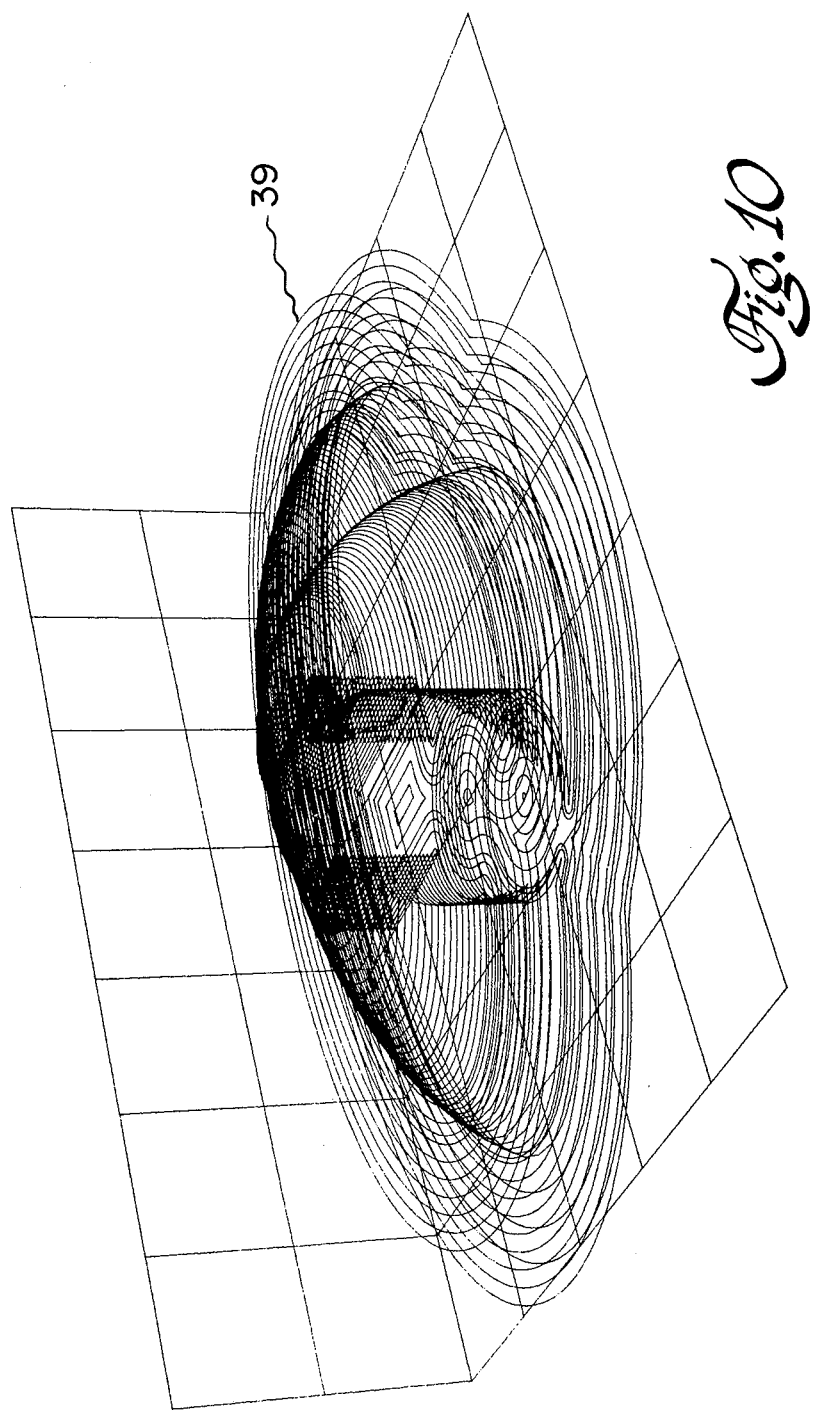
FIG. 10 shows a sequence of finish cutter centerline passes that results from planar slicing of the offset part.

The fifth step comprises taking planar section slices of the offset part and obtaining the section curves which are the intersections of the slicing planes with the offset part. The number and spacing of the parallel slicing planes depends on the desired resolution and tolerance. For each section curve to make a finish cut and offset curves to make rough cuts, NC machine code is generated to direct the milling cutter to follow those curves. At each cutting level, the tool, with its center following the offset part cross section periphery, will machine a section of the desired part, with all tool-surface interferences taken into account. The more discrete cutting levels that are selected, the more refined is the machined part. FIG. 10 shows a sequence of finish cutter centerline passes that results from planar slicing of the offset part. After each closed loop pass 39 is machined, a tool pickup and translation to the beginning of the next machining loop is commanded. For clarity, this aspect of the tool motion is not shown in FIG. 10, but is essential for proper cutting of the part without gouging. The rough cut tool paths are not illustrated.

Figure 11:
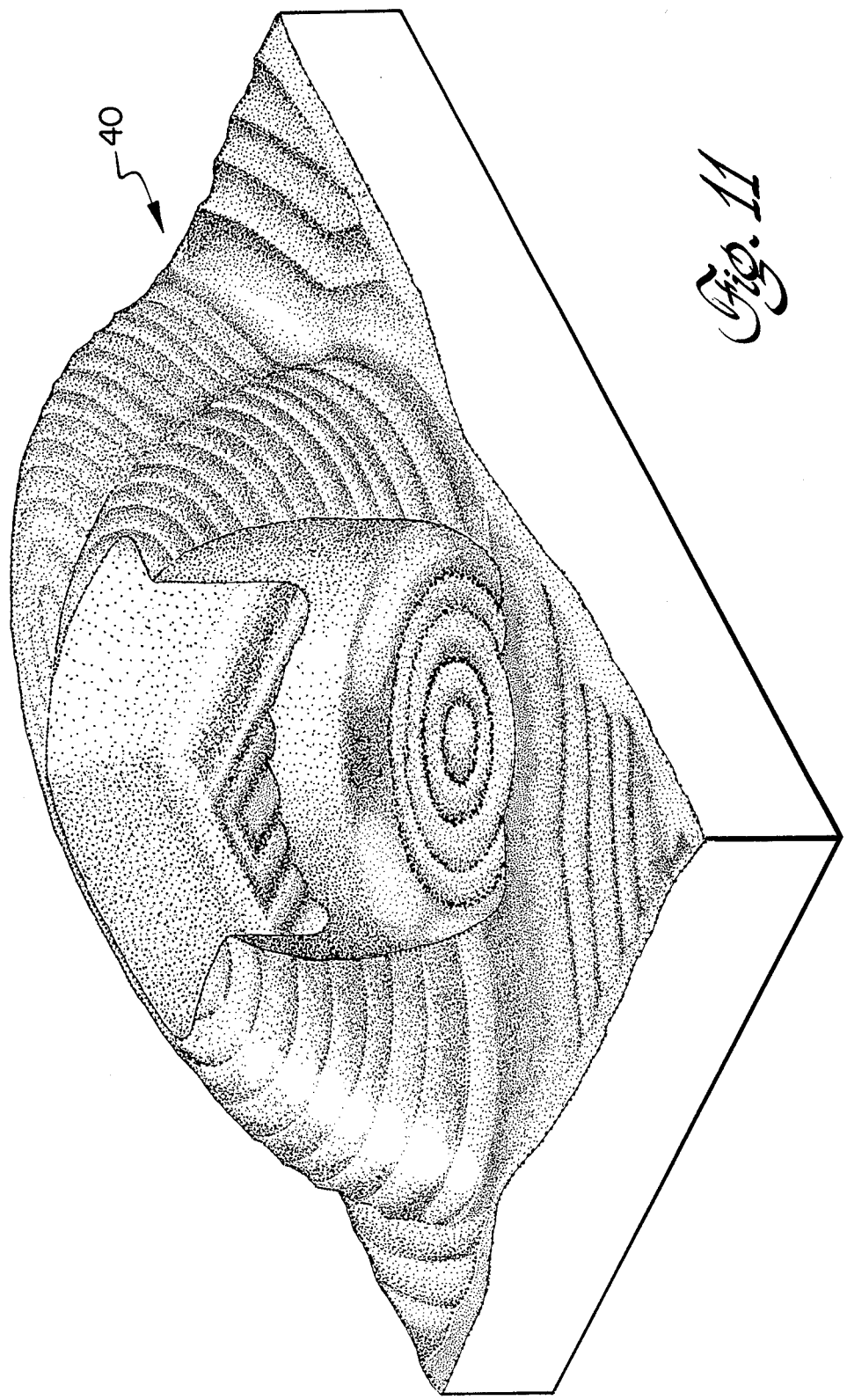
FIG. 11 is a perspective view of the machined part.
Figure 12:
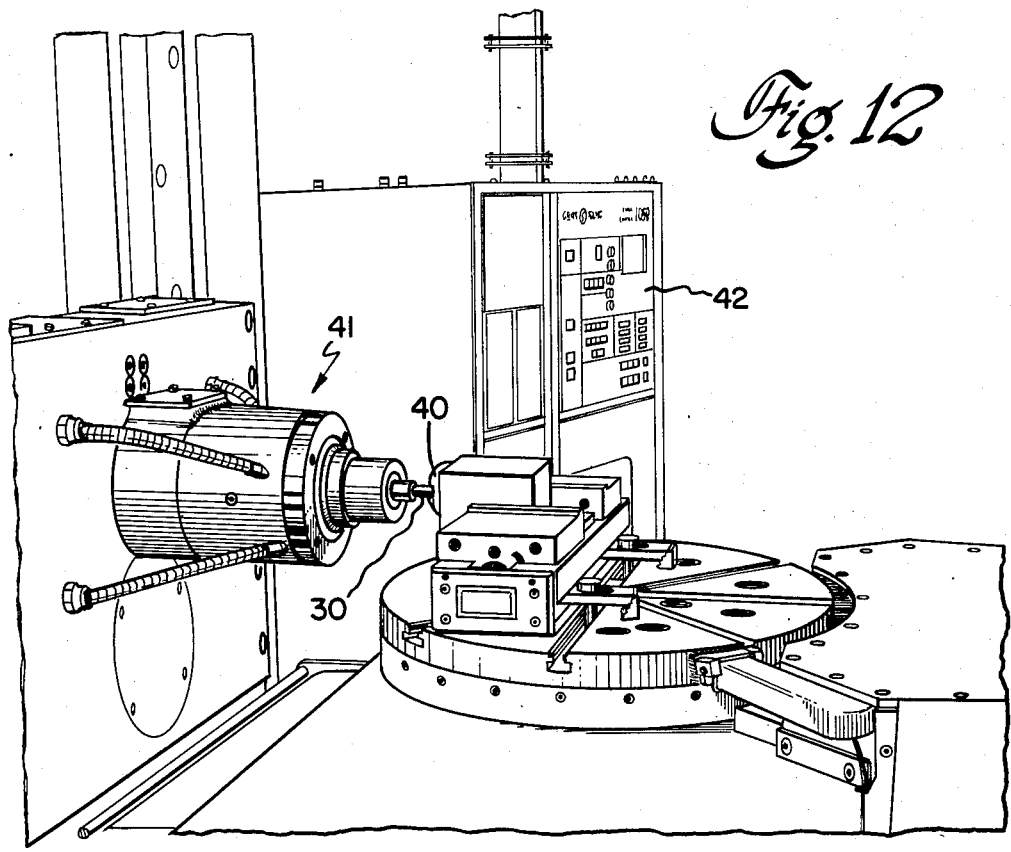
FIG. 12 illustrates the part being cut out on a numerical machine tool.

The sixth step is that the desired part is machined with a ball end cutter, and the resulting part 40 is shown in FIG. 11. A comparison of FIGS. 11 and 9 verifies that machining based on plane section slices of the offset part results in the desired part shape. Experimental verification of the invention and actual machining of this part were performed on the Ex-Cell-O 108A Workcenter using the GE Mark Century 1050 Numerical Control. Part of the machine tool 41 and controller 42 are illustrated in FIG. 12 which shows the part 40 clamped in a holder being cut by the ball end cutter 30. The machine tool is operated in the conventional manner; NC machine code is recorded on magnetic tape and inserted into the tape reader on the controller. The only other equipment needed to practice the invention is a standard computer with a graphics display terminal and a software program.

Figure 13:
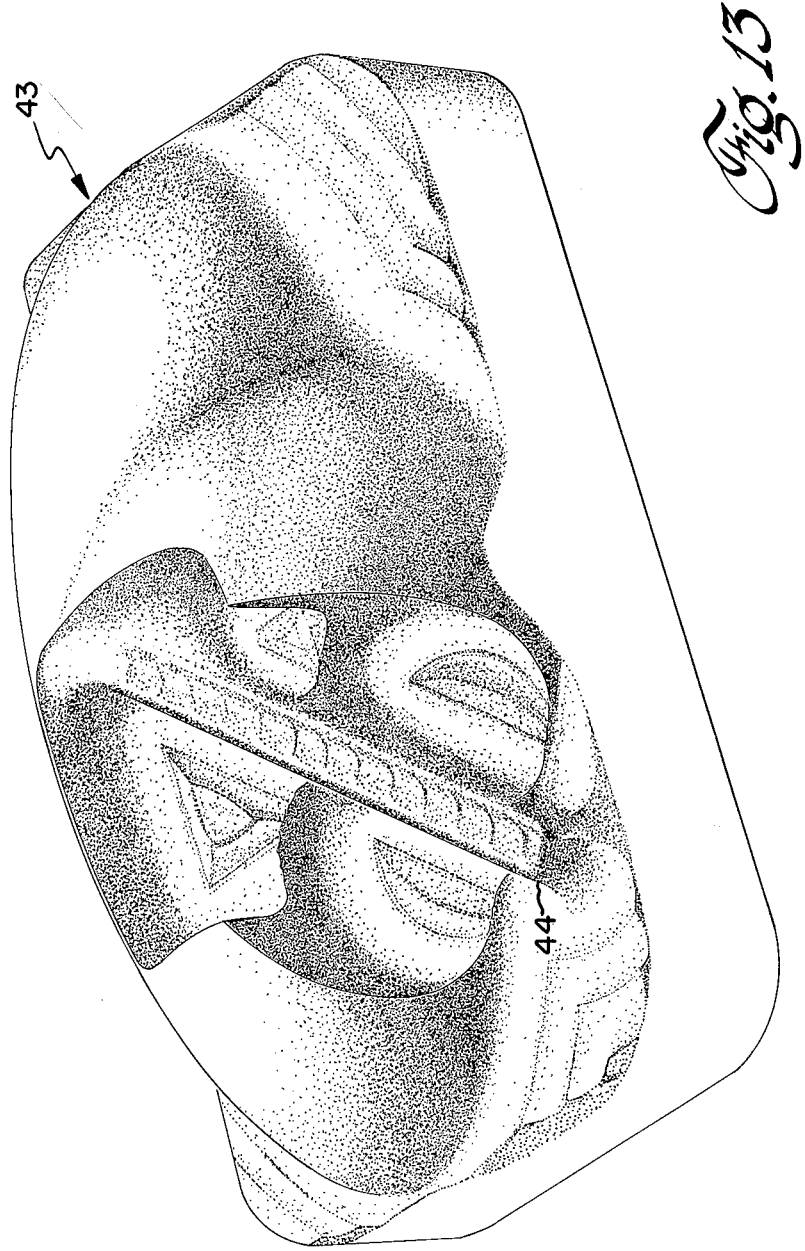
FIG. 13 shows a new part produced by adding a rib to the part in FIG. 11.

One application for this concept is to achieve automatic decriptions of plastics core and cavity from descriptions of nominal part shape as a constructive solids model. Automatic machining of core and cavity will then be accomplished by calculating the offset trajectories and interfacing them with a numerical machine tool. The versatility of the automatic, interference-free machining method is illustrated by the ease of adding an upstanding strengthening rib to the part in FIG. 11. A new part shape is defined by the addition of a rib-shaped primitive to the part definition. Referring to FIG. 13, the new part 43 with the rib 44 was machined using the same set of commands, outside of the rib definition, that produced the part without the rib (FIG. 11). Thus, a family of parts may be manufactured with only small modifications in the input code. Another advantageous property of the process is that the ability to define the cavity which encloses a given part shape is inherent to the description of parts via Boolean operators. A cavity or mold for a given part is simply defined by subtracting the part from a block of material. In FIG. 14 is illustrated the cavity 45 for the ribbed part 43. The mold is machined using the same technique and commands which produced the previous parts.

Concerning the mathematical techniques to practice the invention, the following are needed:
1. Offset primitives, mathematically expressed;
2. A solid modeler with the ability to make full scale Boolean combinations of primitives;
3. The ability to produce planar slices through individual primitives;
4. The ability to resolve these individual curves into a sorted collection of loops using the same Boolean set relationships among the curves as existed for the primitives; and
5. Converting the curve slices to machine tool position commands.

The preferred solid modeler is General Electric's TRUCE (Tri-dimensional Rational Unified Cubic Engine), which is described in the TRUCE User's Manual, July 1984. A simplified program listing using this solid modeler language, to produce the machine tool position commands to manufacture the sample part discussed in FIGS. 8-11, is given in Table 1.

TABLE I

| | |
|---|---|
| PRIM/EEE | $ DEFINE PRIMITIVE SHAPES |
| ELL | |
| POINT/0, .3 | |
| VECTOR/1 | $ Ellipsoid |
| VECTOR/0,1 | |
| LENGTH/2.5,1.2 | |
| OFFSET/.25 | |
| END | |
| PRIM/SSS | |
| SPH | |
| POINT/.2,.1,0 | $ Sphere |
| RADIUS/1.4 | |
| OFFSET/.25 | |
| END | |
| PRIM/BLO | |
| BOX | |
| POINT/−2.5,−1.5,−.1 | $ Large box (block) |
| LENGTH/5.0,3.0,2.3 | |
| OFFSET/.25 | |
| END | |
| PRIM/CCC | |
| RCC | |
| POINT/1,.7,.2 | $ Cylinder |
| RADIUS/.85 | |
| VECTOR/0,0,2.05 | |
| OFFSET/−.25 | |
| END | |
| PRIM/BBB | |
| BOX | |
| POINT/−.25,.5,.55 | $ Small box |
| LENGTH/1.5,1.7,2.0 | |
| OFFSET/−.25 | |
| END | $ END PRIMITIVE DEFINITIONS |
| SET/SE1 | $ SET DEFINITIONS (REPRESENT BOOLEAN OPERATIONS) |
| SE1=EEE,SUM,SSS | $ Set 1 = Ellipsoid plus sphere |
| END | |
| SET/SE2 | |
| SE2=SE1,SUM,BLO | $ Set 2 = Set 1 plus block |
| END | |
| SET/SE3 | |
| SE3=SE2,DIF,BBB | $ Set 3 = Set 2 minus small box |
| END | |
| SET/PRT | $ Final set represents the entire offset part: |
| PRT=SE3,DIF,CCC | $ Set 4 (Part) = Set 3 minus cylinder |
| END | $ END SET DEFINITIONS |
| CIRFIT/FEED,40,80,150 | |
| CIRFIT/RADIUS,.25 | |
| CIRFIT/CLEAR,2.5 | $ ESTABLISH MACHINING PARAMETERS |
| CIRFIT/NCON | |
| CIRFIT/VERIFY | |
| ZSURF/Z,1.6000 | $ DEFINE A Z LEVEL FOR SLICING OFFSET PART |
| BOOLE/SET,PRT | $ TAKE CROSS SECTION OF PLANE WITH BOOLEAN SET |
| CIRFIT/Z001 | $ FIT CROSS SECTION WITH ARCS & PRODUCE NC DATA |
| ZSURF/Z,1.5750 | |
| BOOLE/SET,PRT | $ CONTINUE ABOVE SEQUENCE FOR EACH Z LEVEL ... |
| CIRFIT/Z001 | |

Other solid modeling systems that may be used to practice the invention are ROMULUS (Evans & Sutherland) and SYNTHAVISION (Magi). Papers and manuals that may be referred to for more information and algorithms to form offset primitives, planar section slicing, and translating curve slices to NC machine code are:

(1) Hinds, J. K. and Kuan, L. P., "Sculptered Surface Technology as a Unified Approach to Geometric Definition", Advanced Manufacturing Technology, ed. by P. Blake, North-Holland Publishing Co., 1980, pp. 19–40.

(2) Farouki, R. T. and Hinds, J. K., "TRUCE-the Tridimensional Rational Unified Cubic Engine-User's Manual", General Electric Co., Corporate Research and Development, Schenectady, N.Y.

(3) Lee, R. B. and Fredricks, D. A., "Intersection of Parametric Surfaces and a Plane", IEEE Computer Graphics and Applications, August 1984, pp. 48–51.

(4) Farouki, R. T. and Hinds, J. K., "A Hierarchy of Geometric Forms", IEEE Computer Graphics and Applications, May 1985, pp. 51–78.

Solid modeling is still in its infancy (it is about 5 years old at present). Even so, the automatic, interference-free machining method using constructive solid geometry and offset primitives is producing parts of considerable complexity with less user effort than would be required with other solid modeling/numerical control techniques. The extension of the process to four and five axis machining and to other cutter shapes will allow a wider variety of parts, such as those with undercuts to be made.

While the invention has been particularly shown and described with reference to preferred embodiments thereof, it will be understood by those skilled in the art that the foregoing and other changes in form and details may be made therein without departing from the spirit and scope of the invention.

What is claimed is:

1. The method of machining solid parts on a machine tool having a rotating milling cutter comprising the steps of:

providing a constructive solid geometric description of a desired part expressed as a Boolean combination of primitive shapes;

determining offset primitives by offsetting every primitive shape by an amount equal to the radius of said milling cutter;

creating a description of an offset part which is a Boolean combination of said offset primitives and the result of applying the same set operations as in the initial step;

obtaining curves on the perimeter of said offset part which is the envelope of cutter positions; and generating machine tool position commands to direct said milling cutter to follow said curves, and automatically machining the desired part.

2. The method of claim 1 wherein curves on the offset part perimeter are obtained by taking parallel plane section slices through said offset part and reorganizing these curves into a sorted collection of loops.

3. The method of machining 3-dimensional solid parts with a rotating cutting tool comprising the steps of:

providing a constructive solid geometric description of a desired part expressed as a Boolean combination of primitives and the result of applying a series of set operations;

determining offset primitives by offsetting every primitive by the radius of said cutting tool;

creating a description of an offset part by applying to said offset primitives the same series of set operations;

taking planar section slices of said offset part and obtaining section curves which are the intersections of slicing planes with said offset part and describe the paths followed by the center of said cutting tool; and generating position commands to direct a machine tool to follow said curves to automatically cut the desired part.

4. The method of claim 3 wherein said planar section slices are on parallel slicing planes through said offset part in order to achieve an efficient machining path.

5. The method of claim 3 wherein the last-mentioned step comprises converting said section curves to numerical control machine code.

6. The method of claim 3 and removing gross amounts of material by offsetting said section curves and generating position commands to direct said machine tool to follow said offset curves for rough cutting.

7. The method of claim 3 wherein said set operations are classified as addition and subtraction and the step of offsetting primitives comprises offsetting additive primitives by a positive radius and subtractive primitives by a negative radius.

8. The method of machining 3-dimensional solid parts with a rotating cutting tool comprising the steps of:
providing a constructive solid geometric description of a desired part expressed as a Boolean combination of primitives and the result of applying a series of set operations;
determining offset primitives by offsetting every primitive by the radius of said cutting tool;
creating a description of an offset part by applying to said offset primitives the same series of set operations;
taking planar section slices of said offset part and obtaining section curves which are the intersections of slicing planes with said offset part and describe the paths followed by the center of said cutting tool to make finish cuts;
offsetting every such section curve in its respective slicing plane to obtain paths followed by said cutting tool to make rough cuts; and
generating position commands to direct a machine tool to follow said curves to automatically make rough and finish cuts and machine the desired part.

9. The method of claim 8 wherein said slicing planes are parallel to one another and taken from top to bottom through said offset part at a vertical spacing dependent on resolution and tolerance.

10. The method of claim 9 wherein said set operations are union, intersection and subtraction and the step of offsetting primitives comprises offsetting primitives that are united or intersected by a positive radius and those that are subtracted by a negative radius.

11. The method of machining 3-dimensional solid parts with a ball end cutter comprising the steps of:
providing a constructive solid geometric description of a desired part expressed as a Boolean combination of primitives which is the result of applying an ordered series of Boolean set operations, including union, intersection and subtraction, to said primitives;
determining offset primitives by offsetting primitives which are united or intersected by a positive radius equal to that of said ball end cutter and those which are subtracted by a negative radius;
creating a description of an offset part by applying the aforementioned series of Boolean set operations to said offset primitives;
taking planar section slices of said offset part and obtaining section curves which are the intersections of slicing planes with said offset part and describe the paths followed by the center of said ball end cutter to make a finish cut; and
generating numerical control machine code to direct said ball end cutter to follow said paths, and machining the desired part.

12. The method of claim 11 wherein said cutter paths are closed loops and are traversed in either direction.

13. The method of claim 12 wherein said planar section slices are at parallel slicing planes taken from top to bottom through said offset part and the number and spacing of the parallel slicing planes depends on resolution and tolerance.

14. The method of claim 13 and offsetting said section curves and generating numerical control machine code to direct said cutter to follow said offset curves and make rough cuts before making the previously described finish cut.

* * * * *